March 23, 1937. A. MAVROGENIS Re. 20,307

WIRELESS RECEIVING APPARATUS

Original Filed Jan. 2, 1926 2 Sheets-Sheet 1

Inventor:
Aristote Mavrogenis
By
Attorneys

March 23, 1937. A. MAVROGENIS Re. 20,307
WIRELESS RECEIVING APPARATUS
Original Filed Jan. 2, 1926 2 Sheets-Sheet 2
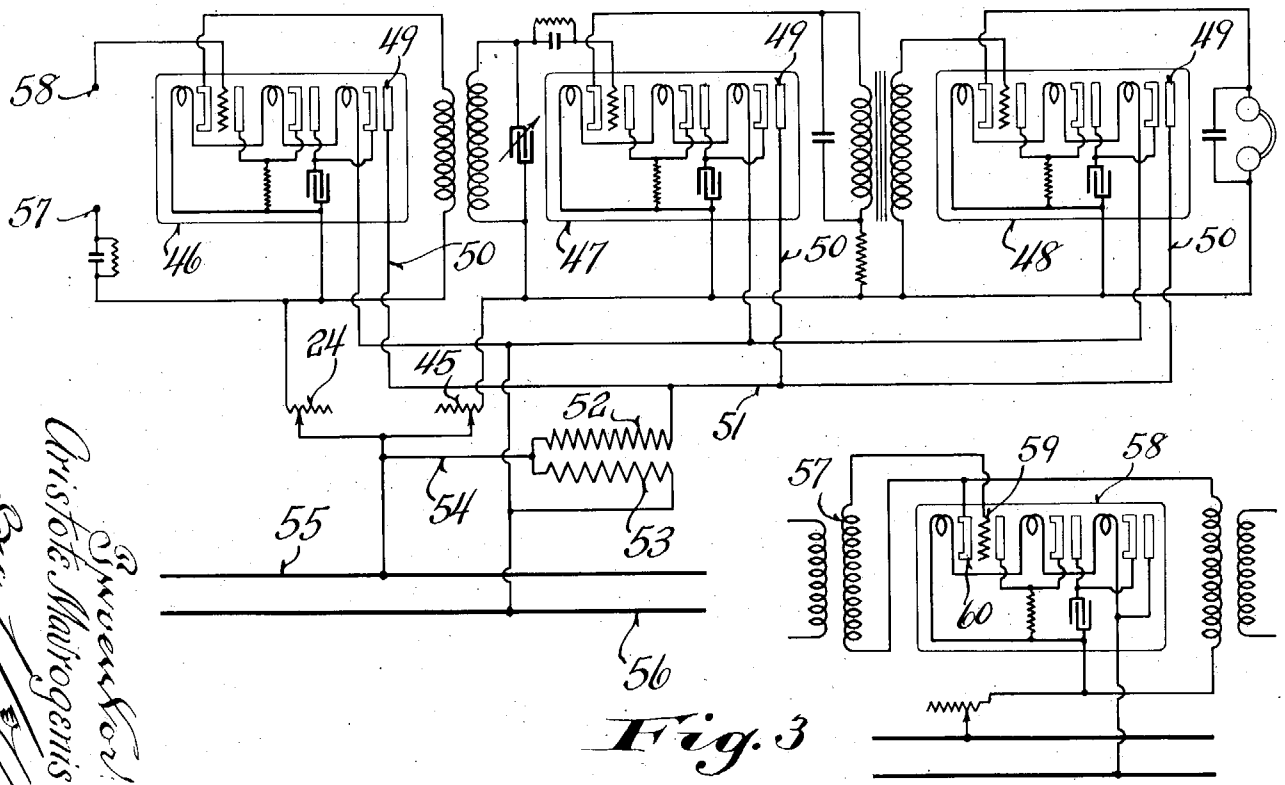
Inventor:
Aristote Mavrogenis
By
Attorneys Reissued Mar. 23, 1937

Re. 20,307

UNITED STATES PATENT OFFICE 20,307

WIRELESS RECEIVING APPARATUS

Aristote Mavrogenis, Milwaukee, Wis., assignor to Radio Corporation of America, New York, N. Y., a corporation of Delaware Original No. 1,660,803, dated February 28, 1928, Serial No. 78,877, January 2, 1926. Application for reissue February 25, 1929, Serial No. 342,609

28 Claims. (Cl. 250—27)

This invention relates to a wireless receiving apparatus.

In wireless receiving systems two main schemes have been used for operating the vacuum tubes. Either a set of batteries for the filament and for the plate have been used or else B-battery eliminators have been substituted for the plate battery and A-battery eliminators have been substituted for the filament batteries. In the first case there is a decided variation in the action of the battery from day to day, and consequently adjustments have been made to eliminate these variations. The batteries have to be recharged or removed at frequent intervals. In the second place, the eliminators, particularly A-battery eliminators, are expensive apparatus and require bulky choke coils and condensers and, even under the best conditions, do not entirely eliminate the hum of the alternating current.

This invention is designed to overcome the defects noted above, and objects of such invention are to provide a wireless receiving apparatus all parts of which are energized from commercial alternating current mains, and in which no objectionable hum occurs.

In general this case is a continuation in part of and in part an improvement over my earlier application Serial No. 682,666, filed December 26, 1923, now Patent Number 1,570,444, of January 19, 1926, for Wireless apparatus, as this invention discloses additional features and improvements over that disclosed in my above noted patent. For instance, this invention discloses, among other things, means whereby a "C" effect or a negative voltage effect is produced from the rectified alternating current on the grid or the control electrode of a signal responsive means, electron discharge device, or vacuum tube. Also it is to be noted that the tubes employed, for the purpose of illustrating the invention, in the system disclosed in this case may, for example, take the form of the tubes disclosed in my Patent No. 1,638,499 of August 9, 1927 for Electron discharge devices. The tubes per se do not form the subject matter of this case, but do form the subject matter of my patent noted immediately above.

Certain features and characteristics of the present invention are embodied also in my prior application Serial No. 669,490, filed October 19, 1923, for a Wireless receiving system and as to such features and characteristics the present case is therefore a continuation in part of the said prior application.

Further objects are to provide an apparatus for wireless reception in which, although the parts are energized from commercial alternating current mains, fluctuations of voltage or current are wholly avoided, and a smooth and dependable operation is assured.

Further objects are to provide a novel form of wireless receiving apparatus which may be employed in a small space in which the parts used are of light weight, and which may be relatively cheaply produced in comparison to the expensive systems heretofore known.

Further objects are to provide a wireless receiving apparatus in which the vacuum tubes or unitary electron discharge devices may be interchangeable and may be used as a detector or as an amplifier for radio energy, whether of audio or radio frequency, and to provide a system in which the plate voltage may be regulated.

Further objects are to provide a wireless receiving apparatus in which the device may be kept in a regulated condition for an indefinite period, and may be relied upon to operate identically under the same conditions from day to day, and in which there is no falling off of voltage due to continued or prolonged use.

Embodiments of the invention are shown in the accompanying drawings, in which:—

Figure 2 is a corresponding view showing a modified form of apparatus, using a stepup transformer and a 5-prong vacuum tube.

Figure 3 is a view of a further form of the invention.

Figure 1:
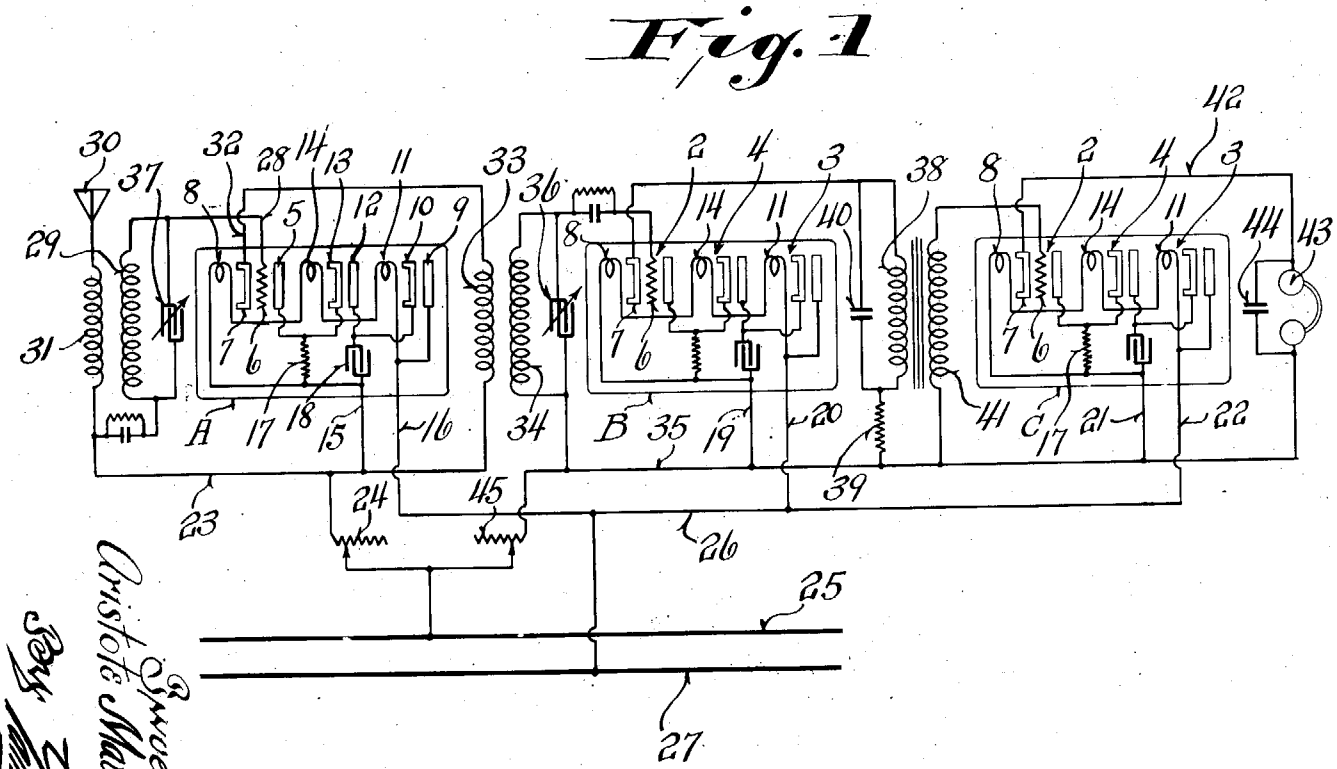
Figure 1 shows one form of the invention employing a 4-prong vacuum tube.

Referring to Figure 1, it will be seen that the unitary electron discharge devices indicated by the reference characters A, B and C, are of similar construction and consequently a description of one will suffice.

Consider for instance one of the devices. It will be seen that such device includes a highly evacuated vessel within which a space discharge device or a tube such as an audion or other signal responsive device, indicated generally by the reference character 2, a rectifier apparatus indicated at 3, and a current limiting apparatus, indicated generally at 4, are employed.

The audion device or the like comprises a plate or anode 5, a grid 6 and an equipotential cathode 7. This cathode 7 is heated by means of a filament 8 and, consequently, is an indirectly heated cathode in the form shown.

The rectifier comprises an anode 9 and a cathode 10, such cathode being heated by a filament 11.

The current limiting device comprises an anode 12 and cathode 13, such cathode being heated by a filament 14.

The filaments 8, 14 and 11 are preferably joined in series and their terminals extend outwardly from the vessel in the form of prongs, such portion of the apparatus being indicated by the conductors 15 and 16.

It is to be noted that a resistance 17 is connected between the cathode 13 of the current limiting device and the outgoing lead 15. Also a condenser 18 is connected between the anode 12 of the current limiting device and the outgoing lead 15.

The unitary electron discharge devices are similar in construction, but their leads are indicated, respectively, at 15—16, 19—20 and 21—22, as they are connected to different portions of the system as will hereinafter appear.

In the form of the invention shown in Figure 1, the conductor 15 is connected to the conductor 23 which in turn is connected through an adjustable resistance 24 to one of the power mains, as indicated at 25. The lead 16 is connected to the conductor 26 and from thence to the other power main 27. Thus, by adjusting the value of the resistance 24, the heating of the filaments 8, 14 and 11 may be simultaneously controlled.

It is to be noted also that the anode 9 of the rectifier is connected to the lead 16 and that the cathode 10 of such rectifier is connected to the anode 12 of the current limiting device and also to one side of the condenser 18.

The cathode 13 of the current limiting device is connected to the plate or anode 5 of the audion or the like and also to one side of the resistance 17.

The operation of the rectifier and current limiting device is detailed in my Patent Number 1,570,444, noted above. However, it may be stated that the cathode 10 is heated by the filament 11 and consequently unidirectional current flows between the anode 9 and the cathode of the rectifier 3. This unidirectional current is pulsating but the pulsations are somewhat smoothed out by the condenser 18. This current passes to the current limiting device 4. In this device, the cathode 13 is maintained in a heated condition by the filament 14 and is worked above its saturation point, so that a straight line current flow is secured irrespective of variations due to the pulsations of the current supplied such device. Consequently, the current leaving the cathode 13 of the current limiting device is of constant value and passes through the resistance 17 back to the lead 15 and from thence back to the condenser 18. In addition to this, the current also passes to the plate 5 of the audion 2. Obviously, since the resistance 17 is of fixed value and the current limiting device worked above saturation point, the audion or the like is supplied with a potential of constant value. In the specific form of the invention illustrated, it is to be noted that a current limiting device is employed which acts as an impedance or resistance and aids in smoothing out pulsations in the rectified current.

Upon reference to Figure 1, it will be seen that the signal responsive device, electron discharge device, or audion of the first unitary device A has its grid 6 connected by means of the conductor 28 with one end of the secondary 29 of the inductively coupled coils at the left hand side of Figure 1. The lower end of the coil 29 is connected through a ground condenser and resistance to the bus bar or sub-main 23.

The antenna 30 is connected through the coil 31 forming the primary of the inductively coupled coils to the conductor or bus bar 23.

The cathode 7 of the signal responsive means, electron discharge device, or audion 2 of the vacuum tube A is connected by means of the conductor 32 with one end of the primary 33 of a radio frequency transformer, the other end of the primary 33 being connected to the conductor 23.

The secondary 34 of the radio frequency transformer has one end connected to the bus bar or conductor 35 and its other end connected through a grid condenser and leak resistance to a grid 6 of the space discharge device or audion of the second unitary device, or second vacuum tube indicated by the reference character B.

It is to be noted that a variable condenser 36 is connected across the terminals of the secondary 34 and similarly a variable condenser 37 is connected between the terminals of the secondary 29. This system, therefore, shows a tuned radio frequency system in which one stage of tuned radio frequency amplification is employed, although, obviously, any number of stages may be similarly employed.

The vacuum tube B is similar in all respects to the vacuum tube A and, therefore, a detailed description is not necessary. The cathode 7 of the electron discharge device or audion of such vacuum tube B is connected through the primary 38 of an audio frequency transformer to the bus bar 35. If desired, a resistance 39 may be employed. The resistance 39 is put in the detector circuit to reduce the voltage impressed on this circuit. This use of the resistance permits the using of similar tubes throughout the entire apparatus, and does not require, therefore, a specially formed detector. Further, the usual by-pass condenser 40 is bridged across the terminals of this primary.

The secondary 41 of the audio frequency transformer has one end connected to the bus bar 35 and its other end connected to the grid 6 of the space discharge device or audion of the vacuum tube C. The cathode 7 of such vacuum tube is connected by means of the conductor 42 with any translating device 43 such as the telephone receiver being bridged by means of the by-pass condenser 44 in the usual manner.

It is to be noted that the leads 20 and 22 from the filaments of the vacuum tubes B and C are connected to the bus bar 26 while the leads 19 and 21 of such filaments are connected to the bus bar 35. This bus bar 35 is joined to the main 25 by means of a variable resistance 45.

In operating the device, it is clear that the exact adjustment desired for the filaments may be attained by adjusting the variable resistances 24 and 45. The adjustment of the resistance 24 controls not only the current flowing through the filaments of the vacuum tube A, but also controls the plate voltage. Similarly, the adjustment of the resistance 45 controls the plate voltage of the tubes B and C and also the current flowing through their filaments, and thereby the audion anode voltage of the tube B, for example, may be maintained, by means of resistance 45, at any suitable value, usually different from the audion anode voltage of the tube A; similarly, the audion anode voltage of the tube A may be maintained, by means of resistance 24, at any suitable value, usually different from the audion anode voltage of the tube C.

It will be seen from reference to Figure 1 that the conductors leading out of the vacuum tubes may be formed as prongs and consequently only four prongs are necessary for this type of device.

Further, it is apparent that the apparatus will give identically the same result under the same conditions of adjustment and that no falling off in voltage and no hum from the alternating current supply mains will be produced.

In the form of the invention shown in Figure 2, a somewhat similar scheme has been shown with the exception that 5-pronged vacuum tubes are employed. Three of these tubes are illustrated, as indicated at 46, 47 and 48. These tubes are similar with those previously described except for the fact that the anode 49 of the rectifier is provided with a separate prong or conductor 50 which extends through the walls of the vessel. These conductors 50 join the bus bar 51 which in turn is connected to one end of the secondary 52 of the step-up transformer. The other end of this secondary is connected to one end of the primary 53 of the transformer and through a conductor 54 is connected to one of the mains 55. The other end of the primary 53 of the step-up transformer is connected to the other main 56. However, it will be noted that the variable resistance 45 is still interposed in the circuit supplying the anodes 49 of the rectifiers as well as the filaments for the tubes 47 and 48 and the voltage impressed upon the anode 49 of these devices is controlled by this resistance. The resistance 24 controls the current flowing through the filaments of the tube 46 and also the voltage supplied the plate 49 of its rectifier.

The terminals 57′ and 58′ are connected to the input portion of the system.

In the form of the invention illustrated in Figure 3, the only difference over that disclosed in Figure 1 is that the secondary 57 of the input transformer for the device indicated at 58, has one end connected to the grid 59 and its other end connected to the equipotential cathode 60 of the device, instead of the connection illustrated in Figure 1. The same input circuit connections as shown in Fig. 3 could obviously be used in the systems shown in Figs. 1 and 2.

It is to be understood that the invention may be applied to other systems than the one shown and also may be modified as to the number of vacuum tubes, electron discharge devices, or other signal responsive means employed, number of filament resistances and other features.

It is to be noted further that although both systems are primarily intended for use with alternating current supply mains that, nevertheless, the system illustrated in Figure 1, by virtue of the conducting connections and circuits, may be energized from direct current supply mains and will prevent any pulsations occurring in such mains from affecting any portion of the apparatus.

Attention is directed to either of Figures 1 or 2. Consider, for example, Figure 1. Current flows from the cathode of any one of the devices through the output or intervalve coupling device to the bus bar 35. There is a drop in voltage through this output instrumentality. Further, the grid is connected through its input coil to the bus bar 35. Consequently, the grid is maintained at a negative potential with reference to the cathode of the audion.

It is to be noted particularly that the arrangement of the circuits is such that an output circuit and an input circuit have a common portion. Further, it is apparent that due to this common portion of the input and output circuits it is possible to secure the "C" effect or negative voltage effect mentioned immediately above. Any form of impedance or resistance could be used to cause a voltage drop due to the space current which flows through a signal responsive device or space discharge device, or due to the current which flows in an output circuit, and consequently to produce a "C" effect or a negative voltage effect on the grid of a signal responsive means or electron discharge device, as an input circuit has a common portion with an output circuit. For example, a resistance 39 may be placed in the common portion to produce a "C" effect or a negative voltage effect, as shown in the drawings. In the example of the invention illustrated, therefore, means are provided for securing this "C" effect from the rectified alternating current which flows through an impedance or resistance or flows across a signal responsive means or electron discharge device or flows in the output circuit of a space discharge device or signal responsive device through an impedance or resistance and produces a voltage drop across the impedance or resistance.

It will be seen that a novel radio signal receiving apparatus has been provided by this invention wherein one or more electron discharge devices, signal responsive means, or tubes may be provided with an equipotential or indirectly heated cathode or cathodes, which permits the use of alternating current for heating the said cathode or cathodes without producing any objectionable variation in the temperature of the indirectly heated cathode during the operation thereof, without unduly affecting the field between the cathode and the anode, and without introducing any disturbing effect into the circuit between the cathode and the grid or control electrode.

It will be seen from the above description and drawings that means as well as appropriate circuit connections interlinking the anode and cathode electrodes of a plurality of electron discharge devices, signal responsive means or tubes may be provided by this invention in a radio signal receiving apparatus, whereby the anode of a device of said apparatus is maintained at a rectified potential different from that of the anode of another of said electron discharge devices or signal responsive means from an alternating current source.

It will further be seen that a novel signal receiving apparatus has been provided by this invention in which means may be provided, whereby the grid or control electrode of a signal responsive means, electron discharge device or tube is maintained at a negative potential with reference to its corresponding cathode, from an alternating current source, without interference of this source in the operation of this apparatus.

It will therefore be seen, further, that a novel signal receiving apparatus has been provided in which all portions of the apparatus may be energized from an alternating current source without producing any objectionable hum or any disturbance in the reception, detection or amplification of the signals or signal energy either at radio or super-audio frequencies or at audio or low frequencies.

For the sake of definiteness it should be noted that the term "radio frequencies" used herein is intended to embrace all frequencies above the audio range, for example, the frequencies customarily used in radio signalling, carrier wave signalling, the intermediate and beat frequencies in superheterodyne or heterodyne receivers, etc. Such frequencies are sometimes also referred to as super-audio frequencies.

It is further to be noted that the term "radio receiving apparatus", or "radio signal receiving apparatus" or "radio signal energy receiving apparatus", or the like, recited in the appended claims is to be construed as meaning any apparatus for receiving signals or signal energy regardless of the source, frequency, modulation, nature or purpose of said signals or signal energy, and regardless of the nature, frequency, or nature of modulation of the carrier wave or waves, and regardless of any particular signal receiving system or systems employed in said apparatus and regardless of any particular signal translating or indicating device employed in said apparatus for translating, indicating or reproducing said received signals.

In the claims the term "signal responsive means" is used to denote one or more tubes, variously known as audions, thermionic tubes, space discharge devices, etc., that is, devices wherein electricity is caused to pass between electrodes in a suitable medium, and thereby be controlled in response to various potentials impressed upon said electrodes.

In conclusion, it will be clearly seen from the disclosure of this invention that means are provided for energizing one or more electron discharge devices, or signal responsive means or vacuum tubes—one form of which has been given merely as an example in the drawings,—of a radio receiving apparatus, from an alternating current supply source such as the city mains, for instance. The illustration of receiving circuits is intended to illustrate only a few of the many embodiments that the invention may take and dispense with the use of A, B, or C batteries, and whereby the addition or use of battery eliminators, particularly B eliminators, is unnecessary, as the system is already provided with all of the essential elements, such as current converting or rectifying means, smoothing means, and the like. Further, from the disclosure of this invention, it will be apparent to one skilled in the art that the means for energizing one or more vacuum tubes, signal responsive means or electron discharge devices of a radio signal receiving apparatus from an alternating current source, as mentioned immediately above, do not depend upon any particular location, form, or type of a part or of various parts in the system, or upon the particular capacity or particular number of current rectifying, or smoothing means employed, or any particular circuit connections thereof, or upon any particular signal receiving system, or upon any particular intervalve coupling means. Therefore, although the invention has been described in considerable detail, such description is intended as illustrative rather than limiting, as the invention may be variously embodied, and as the scope of such invention is to be determined as claimed.

I claim:

1. In a radio receiving apparatus, the combination of a source of radio signal energy, a plurality of unitary discharge devices each including an audion having an equipotential cathode, an anode, a grid, a rectifier including a cathode and an anode, a thermionic current limiting device connected between said rectifier and audion and having a cathode and an anode, a filament for heating each of said cathodes; a reproducing device; input and output circuits connecting said devices with said source of signal energy and with said reproducing device; a source of low frequency alternating current, circuits connecting said filaments, the anodes of said rectifiers, and the cathodes of said audions with said alternating current source; and means for simultaneously increasing or decreasing both the temperature of said filaments and the total voltage supplied the output circuits of said audions.

2. In a radio receiving apparatus, the combination of a source of radio signal energy, a plurality of unitary electron discharge devices each including an audion having an equipotential cathode, an anode, a grid, a rectifier including a cathode and an anode, a thermionic current limiting device connected between said rectifier and audion and having a cathode and an anode, a filament for heating each of said cathodes; a reproducing device; input and output circuits connecting said devices with said source of signal energy and with said reproducing device, said circuits including a connection directly from the equipotential cathode of the audion of one device through the output circuit of such device to the input circuit of a succeeding device; a source of low frequency alternating current, circuits connecting said filaments, the anodes of said rectifiers, and the cathodes of said audions with said alternating current source; and means for simultaneously increasing or decreasing both the temperature of said filaments and the total voltage supplied the output circuits of said audions.

3. In a wireless receiving apparatus, the combination of a source of radio signal energy, a reproducing device, a plurality of unitary electron discharge devices; each of said unitary devices including a rectifier having an anode, a cathode, and an audion having an anode, an equipotential cathode, an interposed grid and a heater for the cathode; means for smoothing out the current supplied by said rectifiers, a source of low frequency alternating current for energizing said unitary devices, input and output circuits for supplying signal energy from one device to a succeeding device, means for simultaneously increasing or decreasing both the temperature of the heaters and the total voltage supplied the output circuits of a group of said audions, said means including an adjustable resistance.

4. In a wireless receiving apparatus, the combination of a source of radio signal energy, a reproducing device, a plurality of unitary electron discharge devices; each of said unitary devices including a rectifier having an anode, and a cathode, and an audion having an anode, an equipotential cathode, an interposed grid, and a heater for said equipotential cathode; means for smoothing out the current supplied by said rectifiers, low frequency alternating current supply mains, and intervalve couplings for supplying signal energy from one device to a succeeding device, the input circuit, the output circuit and one terminal of the audion heater of each of a group of unitary devices being connected directly to a common terminal and to one of said mains, the other of said mains being connected to the other terminal of said heaters and to said rectifiers.

5. In a wireless receiving apparatus, the combination of a source of radio signal energy, a reproducing device, a plurality of unitary electron discharge devices; each of said unitary devices including a rectifier having an anode, and a cathode, and an audion having an anode, an equipotential cathode, an interposed grid, and a heater for said equipotential cathode; means for smoothing out the current supplied by said rectifiers, a source of low frequency alternating current, inter-valve couplings for supplying signal energy from one device to a succeeding device, the input circuit, the output circuit and one terminal of the audion heater of a group of unitary devices being connected directly to a common terminal, and a transformer having a primary energized from said source of alternating current and having a secondary, one end of which is connected to said common terminal and the other end of which is connected to the rectifiers of the said group of unitary devices.

6. In a radio receiving apparatus, the combination of a source of radio signal energy, a group of unitary electron discharge devices, each including an audion having an equipotential cathode, an anode, a grid, and a rectifier including a cathode and an anode for supplying current to said audion; smoothing means connected with said rectifiers for smoothing the current supplied to said audions, filaments for heating the cathodes of said audions, a reproducing device, input and output circuits connecting said devices with said source of signal energy and with said reproducing device, a source of low frequency alternating current, and circuits connecting said filaments, the anodes of said rectifiers and the cathodes of said audions with said alternating current source, means for simultaneously increasing or decreasing both the filament temperature and the total voltage supplied the output circuit of at least one of said audions, said means comprising an adjustable resistance common to said last mentioned circuits.

7. In a wireless receiving apparatus, the combination of a source of radio signal energy, a reproducing device, a plurality of unitary electron discharge devices each including an audion having a cathode provided with a heating circuit, an anode, a grid, and a rectifier having an anode and a cathode for supplying current to said audion anode; smoothing means connected with said rectifiers for smoothing the current supplied by said rectifiers, inter-valve coupling means for supplying signal energy from one device to a succeeding device, a single source of low frequency alternating current for supplying the heating circuits of a group of such audions, and means including the inter-valve coupling means for maintaining a constant negative potential on the grid of at least one of said unitary devices.

8. In a wireless receiving apparatus, the combination of a source of radio signal energy, a reproducing device, a group of unitary electron discharge devices each including an audion having a cathode provided with a heating circuit, a grid and an anode, and a rectifier having an anode and a cathode for supplying current to said audion anode, smoothing means connected to said rectifiers for smoothing the current supplied to said audion anodes, inter-valve coupling means for supplying signal energy from one device to a succeeding device, a source of low frequency alternating current, the heating circuits of each of said audions of said group being connected to common terminals, said smoothing means and rectifiers being connected to said alternating current source, and the input circuits of a group of said devices having a common terminal connected with said smoothing means.

9. In a wireless receiving apparatus, the combination of a source of radio signal energy, a reproducing device, a group of unitary electron discharge devices, each including an audion having a heated cathode provided with a heating circuit, an anode and a grid, and a current limiting device having an anode and a cathode for controlling the energy supplied the audion anode; a source of low frequency alternating current, rectifying means connected with said source of alternating current for supplying said audions through said current limiting devices, all of the heating circuits of said audions being directly electrically connected together and supplied from said source of alternating current, input and output circuits connecting said devices and the reproducing device, said current limiting devices being connected in series with the output circuits of said audions, and the input circuits of said audions being connected to a common terminal.

10. In a wireless receiving apparatus, the combination of a source of radio signal energy, a reproducing device, a group of unitary electron discharge devices each including an audion having a cathode provided with a heating circuit, a grid and an anode, and a rectifier having an anode and a cathode for supplying current to said audion anode; smoothing means connected to said rectifiers for smoothing the current supplied to said audion anodes, inter-valve coupling means for supplying signal energy from one device to a succeeding device, a source of low frequency alternating current for supplying said devices, said smoothing means and rectifiers being connected to said alternating current source, the cathode of at least one of the audions being connected through the corresponding output circuit to the smoothing means, whereby current flows from said cathode of the last mentioned audion through the output circuit to the smoothing means.

11. In a wireless signal energy receiving apparatus, the combination of a group of unitary electron discharge devices each including an audion having a cathode, a grid and an anode, and a rectifier for supplying audion anode current; rectifier circuits, audion cathode heating circuits, inter-valve coupling means for supplying signal energy from one device to a succeeding device, a source of alternating current, a reproducing device, and smoothing means connected to said rectifiers for smoothing the current supplied to said audion anodes, the rectifier circuits including impedance means supplied with alternating current from said source and said smoothing means, the rectifier circuits and the audion heating circuits of a plurality of said unitary devices having at least one common terminal.

12. In a wireless signal energy receiving apparatus, the combination of a group of unitary electron discharge devices each including an audion having a cathode, a grid and an anode, and a rectifier for supplying audion anode current; rectifier circuits, audion cathode heating circuits, inter-valve coupling means for supplying signal energy from one device to a succeeding device, a source of alternating current for energizing said electron discharge devices, a reproducing device, and smoothing means connected to said rectifiers for smoothing the current supplied to said audion anodes, the rectifier circuits including said smoothing means, the audion node circuits of at least two of said unitary devices being energized at different potentials from said rectifier circuits and having at least one common terminal with the rectifier circuits of said two unitary devices.

13. In a wireless receiving apparatus, the combination of a source of radio signal energy, a group of unitary electron discharge devices each including an audion having a cathode, a grid and an anode, and a rectifier for supplying audion anode current; rectifier circuits, audion cathode heating circuits, inter-valve coupling means for supplying signal energy from one device to a succeeding device, a source of alternating current, a reproducing device, and smoothing means connected to said rectifiers for smoothing the current supplied to said audion anodes, the rectifier circuits including said smoothing means, the rectifier circuits of at least two of said unitary devices having two common terminals, at least two of said rectifier circuits having a common terminal which is connected to a heating circuit, the input circuits of at least two of said unitary devices having a common terminal connected with said smoothing means.

14. In a radio signal receiving apparatus, the combination of signal responsive means including a plurality of electron discharge devices, at least one of said devices having an indirectly heated electron-emitting cathode, an anode, a control electrode, and cathode heating means for heating said cathode, a heating circuit supplied with alternating current for energizing said cathode heating means, rectifying means for energizing a plurality of electrodes of said last mentioned device, said rectifying means being mechanically distinct and separate from all electrodes of any signal responsive device, there being an electrical circuit connected to said cathode and to said control electrode, means supplied from said rectifying means for maintaining said control electrode negative with respect to said cathode, smoothing means connected to said rectifying means for smoothing out pulsations in the rectified potential, and an alternating current source for producing through said rectifying means a difference of potential between two points in said electrical circuit without undue interference in the operation of said apparatus, and for supplying a substantially uniform positive potential to the anode of said last mentioned device.

15. In a radio signal receiving apparatus, the combination of signal responsive means including a plurality of electron discharge devices, at least one of said devices having an indirectly heated electron-emitting cathode, a control grid, an anode, and cathode heating means for heating said cathode, and being provided with a grid circuit and an anode circuit having a common portion, a heating circuit supplied with alternating current for energizing said cathode heating means, rectifying means for supplying at least one of said circuits, said rectifying means being mechanically distinct and separate from all electrodes of at least one of said devices, said common portion being supplied with rectified current and producing a negative potential on said control electrode with respect to said cathode, smoothing means connected to said rectifying means for smoothing out pulsations in the rectified current, and an alternating current source for supplying said common portion through said rectifying means without undue interference in the operation of said apparatus.

16. In a radio signal receiving apparatus, the combination of signal responsive means including an electron discharge device having an indirectly heated cathode, an electron controlling element, an anode, and a heating element for heating said cathode to emit electrons, there being an output circuit interlinking said anode and said indirectly heated cathode, an alternating current source for supplying said electron discharge device, a heating circuit for supplying said heating element with alternating current from said source, rectifying means mechanically distinct and separate from the electrodes of said device for rectifying alternating current supplied from said source and for supplying rectified positive potential to said anode from said source, means for supplying negative potential to said controlling element from said source without undue interference from said source in the operation of said apparatus, and means, acting in addition to said indirectly heated cathode, for preventing disturbance due to said alternating current in said apparatus.

17. In a radio signal energy receiving apparatus, the combination of signal responsive means including an electron discharge device having cathode, anode and grid electrodes, rectifying means mechanically distinct and separate from any electrode of said device for supplying said device, the cathode of said device being an indirectly heated electron-emitting cathode designed for energization by alternating current, an input circuit connected to said device, an output means, a source of alternating current for energizing said device, a heating circuit for supplying cathode heating alternating current to said device from said source, means for maintaining a potential difference between the cathode and grid electrodes of said device from said source without undue interference from said source in the operation of said apparatus, whereby said grid is maintained negative with respect to said cathode, circuit connections interlinking said anode with said indirectly heated cathode, whereby said anode may be maintained at any suitable potential with reference to said indirectly heated cathode from said source through said rectifying means, and means, acting in addition to said indirectly heated cathode for preventing disturbance due to said alternating current in said apparatus.

18. In a radio signal energy receiving apparatus, the combination of signal responsive means including a plurality of electron discharge devices, at least one of said devices having indirectly heated electron-emitting cathode, anode and grid electrodes, the cathode of said device being provided with cathode heating means designed for energization from a source of alternating current, an input circuit connected to said grid, a source of alternating current for energizing said device, a heating circuit for supplying said cathode heating means with alternating current from said source, a rectifying means mechanically distinct and separate from the electrodes of any of said devices for rectifying alternating current from said source and for supplying rectified positive potential to said anode, means for maintaining a potential difference between the cathode and grid electrodes of said device from said alternating current source through said same rectifying means without undue interference from said source in the operation of said apparatus, whereby said grid is maintained negative with respect to said cathode, an output device between said cathode and said anode, and smoothing means for smoothing out pulsations in the current supplied by said rectifying means, whereby said apparatus operates without interference from said source of alternating current.

19. In a radio signal receiving apparatus, the combination of a plurality of electron discharge devices, at least one of said discharge devices having an indirectly heated electron-emitting cathode, a control electrode, an anode, and cathode heating means for heating said cathode, and being provided with an anode circuit, including an output device, and a grid circuit having a common portion, resistance means in said common portion, a heating circuit supplied with alternating current for energizing said cathode heating means, rectifying means for supplying at least one of said grid and anode circuits, said common portion being supplied with rectified current and producing a negative potential on said control electrode with respect to said cathode, smoothing means connected to said rectifying means for smoothing out pulsations in the rectified current, and an alternating current source for supplying said common portion through said rectifying means without undue interference in the operation of said apparatus.

20. In a radio signal receiving apparatus, the combination of signal responsive means including an electron discharge device having an indirectly heated electron-emitting cathode, a control grid, an anode, and cathode heating means, including a heating element placed on the opposite side of said cathode with reference to said anode, for heating said cathode, and being provided with an anode circuit, including an output device, and a grid circuit having a common portion, an impedance device in said common portion, a heating circuit supplied with alternating current for energizing said cathode heating means, rectifying means for supplying at least one of said grid and anode circuits, said rectifying means being mechanically distinct and separate from all electrodes of at least one of said signal responsive means, said common portion being supplied with rectified current and producing a negative potential on said control grid with respect to said cathode, smoothing means connected to said rectifying means for smoothing out pulsations in the rectified current, and an alternating current source for supplying said common portion through said rectifying means without undue interference in the operation of said apparatus.

21. In a radio signal energy receiving apparatus, the combination of signal responsive means including an electron discharge device having an indirectly heated electron-emitting cathode, an electron controlling element, an anode, and cathode heating means including a heating element for heating said cathode to emit electrons, said cathode being positioned between said heating element and said anode, an output device between said anode and said indirectly heated cathode, a source of alternating current, a heating circuit for supplying said cathode heating means from said source, rectifying means mechanically distinct and separate from the electrodes of said device for rectifying alternating current from said source and supplying rectified positive potential to said anode from said source, means for supplying negative potential to said controlling element from said source without undue interference from said source in the operation of said apparatus, and means, acting in addition to said indirectly heated cathode for preventing disturbance due to said alternating current in said apparatus.

22. In a radio signal energy receiving apparatus, the combination of alternating current source, a rectifying means, signal responsive means having an anode, a control electrode and an indirectly heated electron-emitting cathode heated by a heating element adjacent thereto, said cathode being positioned between said heating element and said anode, an output device between said anode and said cathode, input means between said control electrode and said cathode, said rectifying means rectifying alternating current from said source and supplying at least operating rectified potential to said anode, means for supplying a continuous negative potential on said control electrode with respect to said cathode from said source through said rectifying means without interference from said source in the operation of said apparatus, and smoothing means for at least reducing pulsations in the rectified potential supplied to said signal responsive means from said source of alternating current.

23. In a radio signal energy receiving apparatus, the combination of a source of alternating current, rectifying means, signal responsive means including an electron discharge device having an anode, a control electrode and an electron-emitting cathode heated by a heating element positioned on the opposite side of said cathode with reference to the corresponding anode and energized from said source of alternating current, said cathode being thereby an indirectly heated cathode, said rectifying means rectifying alternating current from said source and supplying anode positive potential to said discharge device, circuit connections for supplying cathode heating current to said discharge device from said source, means including impedance for supplying a continuous rectified negative potential to the control electrode of said discharge device in said apparatus from said source without undue interference from said source, and means acting in addition to said indirectly heated cathode, for preventing disturbance due to said alternating current in said apparatus.

24. In a radio receiving circuit, the combination comprising an electron discharge device including an indirectly heated cathode and an anode, said cathode being provided with heating means, a rectifier having a heatable filament and an anode, a circuit including a resistance, said heating means and said filament adapted to be energized by direct or alternating current, a filter connected to the output of said rectifier, and a connection from the filter to the anode of said discharge device whereby a substantially constant potential is supplied thereto either from a direct or alternating current source.

25. In a circuit of the type described, the combination comprising a multi-electrode vacuum tube including an indirectly heated cathode and an anode, said cathode being provided with heater means insulatingly spaced therefrom, a rectifier having a heatable filament and an anode, a circuit including said heater means and said filament adapted to be energized by direct or alternating current, a filter connected in the output of said rectifier, and connections from the filter and the anode of said vacuum tube whereby a substantially constant potential is supplied thereto either from a direct or an alternating current source.

26. In a circuit of the type described, the combination comprising a multi-electrode vacuum tube including an indirectly heated cathode and an anode, said cathode being provided with heater means insulatingly spaced therefrom, a rectifier having a heatable filament, a circuit including a resistance, said heater means and said filament adapted to be energized by direct or alternating current, a filter connected in the output of said rectifier, and connections from the filter and the anode of said vacuum tube whereby a substantially constant potential is supplied thereto either from a direct or an alternating current source.

27. In a radio circuit for connection to a source of pulsating power, the combination comprising a multi-electrode vacuum tube including an indirectly heated cathode, a cathode heater insulatingly spaced from the cathode and an anode, a unilaterally conducting electron space discharge device having a heatable filament, the space path of said unilaterally conducting electron discharge device and the anode-cathode discharge path of said vacuum tube being in a conductive circuit connected across said source, said cathode heater and said filament being conductively connected across said source, a filter connected in the output of said discharge device and connections from the filter and the anode of said vacuum tube whereby a substantially smooth potential is applied to said anode from said source.

28. In a circuit of the type described, the combination comprising a multi-electrode vacuum tube including an indirectly heated cathode, a cathode heater insulatingly spaced therefrom and an anode, a rectifier having a cathode, a cathode heater and an anode, a circuit including said heaters adapted to be energized by direct or alternating current, a filter connected in the output of said rectifier, and connections from the filter and the anode of said vacuum tube whereby a substantially constant potential is supplied thereto either from a direct or an alternating current source.

ARISTOTE MAVROGENIS.